United States Patent [19]
McArthur

[11] Patent Number: 5,237,815
[45] Date of Patent: Aug. 24, 1993

[54] CONTROL OF A HYDRAULIC START SYSTEM

[75] Inventor: Malcolm J. McArthur, Escondido, Calif.

[73] Assignee: Sundstrand Corporation, Rockford, Ill.

[21] Appl. No.: 656,506

[22] Filed: Feb. 19, 1991

[51] Int. Cl.⁵ ............................................ F02C 7/268
[52] U.S. Cl. ...................................... 60/39.142; 60/627
[58] Field of Search ............... 60/39.141, 39.142, 625, 60/626, 627

[56] References Cited

U.S. PATENT DOCUMENTS

| | | | |
|---|---|---|---|
| 2,845,916 | 8/1958 | Pihiel | 123/179 |
| 2,959,918 | 11/1960 | West | 60/39.14 |
| 2,986,005 | 5/1961 | Dudley | 60/39.142 |
| 3,156,229 | 11/1964 | Manning | 60/39.142 |
| 3,812,378 | 5/1974 | Coman | 290/38 |
| 4,355,509 | 10/1982 | Fulkerson et al. | 60/449 |
| 4,445,532 | 5/1984 | Mitchell | 60/39.142 |
| 4,702,273 | 10/1987 | Allen, Jr. et al. | 137/487.5 |
| 4,747,270 | 5/1988 | Klie et al. | 60/627 |
| 4,817,459 | 4/1989 | Erikson et al. | 74/687 |

Primary Examiner—Louis J. Casaregola
Attorney, Agent, or Firm—Antonelli, Terry, Stout & Kraus

[57] ABSTRACT

A fluidic starter for turbines using a flow limiter (20) and a mechanical valve (32) that is maintained closed until an operator moves a handle to provide fluid which has passed through the flow limiter to a starter motor (16) mechanically connected to the turbine. The handle is latched so the valve is open until the turbine is started then the handle is unlatched and the valve closes.

1 Claim, 3 Drawing Sheets

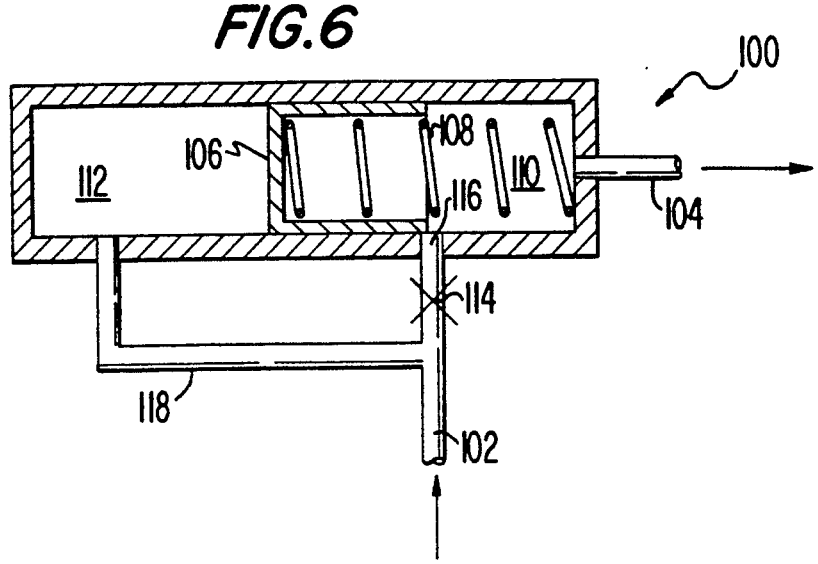
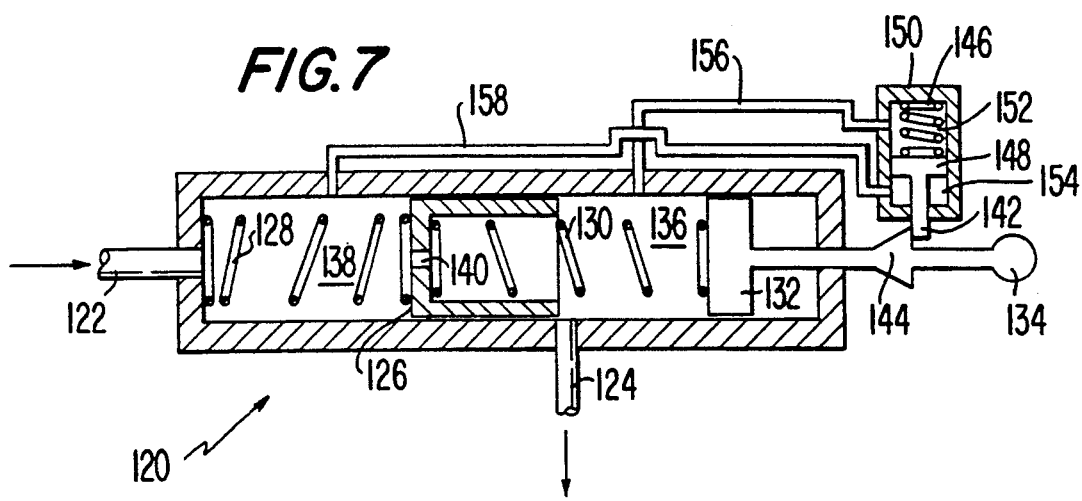
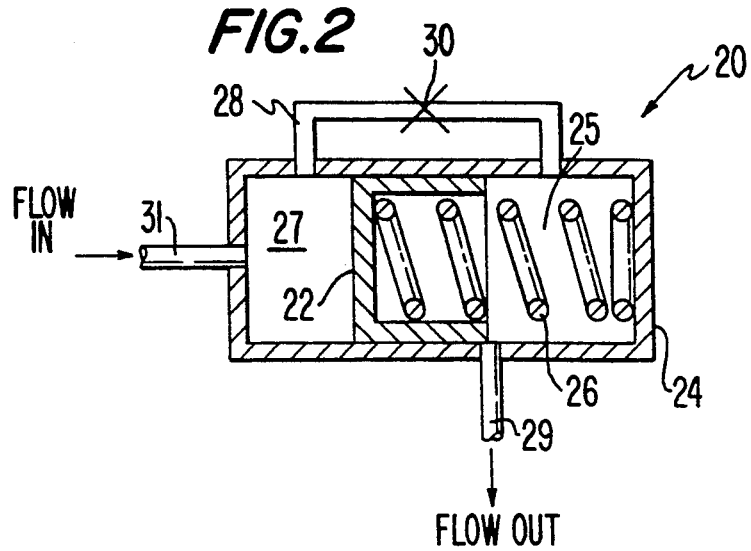

CONTROL OF A HYDRAULIC START SYSTEM

TECHNICAL FIELD

The present invention generally relates to control of systems for starting turbines using fluids (pneumatic or hydraulic), and more particularly to permitting manual starting of turbines with protection from either too early or late closing of manual starting valves by use of valve controllers.

BACKGROUND ART

Turbines are conventionally started hydraulically, electrically or pneumatically. If hydraulic or pneumatic systems are used to start an aircraft auxiliary power unit (APU) electrical power is not normally available until the APU output shaft has exceeded some initial rotational speed to drive a generator. The consequences of not having initial electrical power include the inability to use electronic controller circuitry normally associated with APUs to perform such functions as opening and closing valves for the starting systems. Previously, when pneumatic or hydraulic starting systems were used, the operator had to manually close down the starting system after the APU began operation. This is not a reliable approach because if the starting system is turned off too early the APU will fail to complete the starting process; if, in the alternative, the starting system is turned off too late the starter motor may overspeed which makes failure of the starter system likely.

To address these and other problems, various previous methods have been devised. U.S. Pat. No. 3,812,378 to Coman describes the use of a permanent magnet generator for providing a first pulse train with each of the pulses having a duration that is a function of the rotational speed of the starter rotor. A second pulse generator is also provided, with the second pulse train having a constant pulse width; the second pulse train time width corresponds to a predetermined rotational speed of the starter rotor at which the starter is to be turned off. The first and second pulse trains are provided to a comparator circuit that produces an output signal when the duration of a pulse from the first pulse train is shorter than a pulse from the second pulse train, i.e. the starter rotational speed exceeds the predetermined rotational speed. This output signal from the comparator circuit is then used to turn the starter off. The clear disadvantage of this system is the requirement for electrical power from the very initiation of the starting process.

Another starter control system is described in, U.S. Pat. No. 4,747,270 to Klie et al, here a pneumatic starting device is disclosed. The pressure in a reservoir supplying gas to a pneumatic starting device is monitored, and the monitored pressure is exclusively used to end the starting process. As the gas pressure drops in the reservoir the maximum speed of the starter is limited. Since pressure drop in the reservoir is used to end the starting procedure, the reservoir must be constructed with only a capacity sufficient for carrying out one starting. This is an inescapable disadvantage, and is especially problematic for aircraft operating from austere airfields.

DISCLOSURE OF THE INVENTION

It is an object of the present invention to provide a fluidic—either pneumatic or hydraulic starting system for turbines which require no electrical power beyond that produced by the turbine after it has begun to rotate.

Another object of the present invention is to provide a fluidic starting system that determines when the turbine no longer needs rotational energy from a starter motor. Thus, the starter motor is protected from operation at an excessively high rotational speed.

Still another object of the present invention is to provide a fluidic starting system that may be easily incorporated in current fluidic starter systems already in service.

These and other objects are attained in a preferred embodiment of the present invention for an hydraulic starter for APUs by providing a manual valve between a starter hydraulic accumulator and an hydraulic starter motor with a flow limiter between the hydraulic accumulator and the manual valve. In parallel with the manual valve between the flow limiter and the hydraulic starter motor can be a solenoid actuated valve. The manual valve is spring loaded closed and the solenoid valve is also maintained closed when there is no electrical power provided to the solenoid. Mechanically connected to the APU, in addition to the hydraulic starter motor, is a permanent magnet generator. The output of the electrical (typically of the permanent magnet type) generator is provided to an electronic controller through a power conditioning unit. Subsequent to the operator opening the manual valve and hydraulic fluid passing from the accumulator to the hydraulic starter motor, the APU will reach between 5 and 10 percent of normal operating speed. At that time the electrical generator will supply sufficient electrical energy to energize the solenoid valve open. In addition to energizing the solenoid valve open, an indicator such as a light or electromechanical pointer can be energized to positively notify the operator to release, and thus close, the manual valve. As the hydraulic starter motor continues to drive the APU up in speed, the electrical energy supplied by the permanent magnet generator will provide signals to control the solenoid valve, and when the APU is sufficiently started will close that valve. Alternative embodiments include use of electromechanical valves that combine the functions of the manual valve, the flow limiter and the solenoid valve. These are discussed in detail below.

BRIEF DESCRIPTION OF THE DRAWINGS

The various objects, advantages and novel features of the present invention will become more readily apprehended from the following detailed description when taken in conjunction with the appended drawings, in which:

FIG. 2 is a sectional view of a flow limiter for controlling hydraulic fluid to a hydraulic starter motor in accordance with the present invention;

FIG. 6 is a sectional view of a flow limiter which closes off flow at a predetermined flow rate; and, FIG. 7 is a sectional view of an alternative combined manual and solenoid valve with flow limiter that is hydraulically controlled for providing hydraulic fluid to a hydraulic starter motor in accordance with the present invention.

BEST MODE FOR CARRYING OUT THE INVENTION

Figure 1:
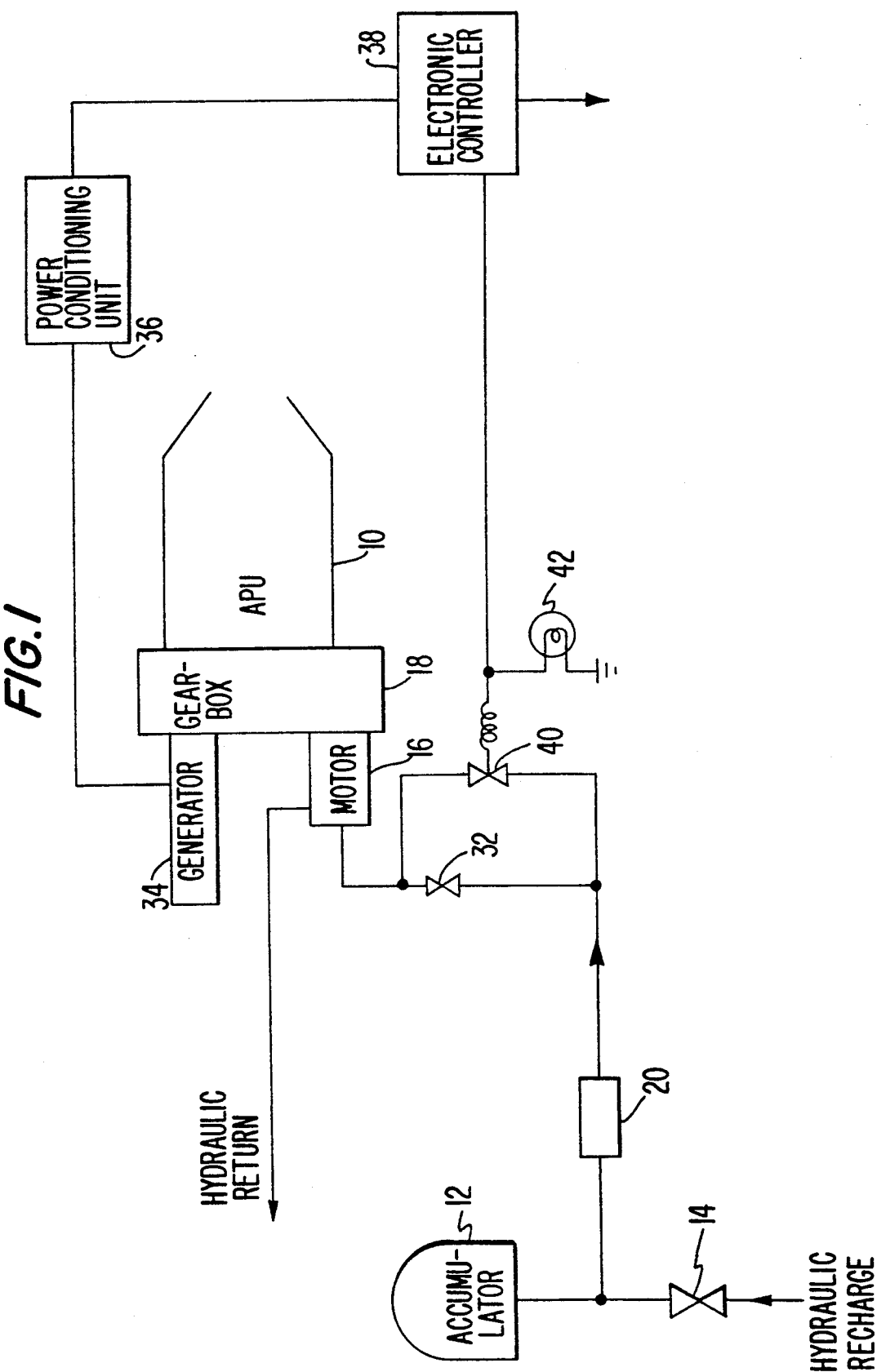
FIG. 1 is a schematic diagram of the hydraulic APU starting system in accordance with the present invention.

Referring now to the drawings, wherein corresponding components are designated by the same reference numerals throughout the various figures, a hydraulic manual starting system according to the present invention for an APU is shown in FIG. 1. The hydraulic manual starting system utilizes components known in the art for a hydraulic accumulator 12, a check valve 14 for recharging the hydraulic accumulator 12, a hydraulic starter motor 16 and a gearbox 18 interconnecting the hydraulic starter motor 16 to the APU 10.

For this first embodiment of the invention a flow limiter 20 is used between the hydraulic accumulator 12 and the hydraulic starter motor 16. A sectional drawing of a flow limiter 20 that could be used with the present invention is shown in FIG. 2. This flow limiter 20 includes a piston 22 which is positioned in the flow limiter body 24 by the force of a spring 26 and the differential hydraulic fluid pressure between the front and back of the piston 22. The differential hydraulic fluid pressure is in part relieved by an hydraulic fluid bypass 28 which includes an adjustable orifice valve 30. The hydraulic fluid flow rate passing through the flow limiter 20 depends on the size of the orifice valve 30 and the magnitude of the force from the spring 26 on the piston 22. If the orifice size does not have to be adjusted, then the bypass 28 and the orifice valve 30 can be eliminated by putting a fixed size orifice in the face of the piston 22. With no flow of hydraulic fluid through the flow limiter 20, the spring 26 maintains the piston 22 so that hydraulic fluid can flow through the flow limiter 20. However, when hydraulic fluid begins to flow through the flow limiter 20 the fluid pressure in the cavity 25 of the flow limiter 20 adjacent the outlet 29 from the flow limiter 20 is lower than the fluid pressure in the cavity 27 of the flow limiter 20 adjacent the inlet 31. This differential fluid pressure causes the piston 22 to move into the cavity 25 adjacent the outlet 29. If the dynamic flow rate is large enough the piston 22 will partially close off the outlet 29 and hydraulic fluid will be limited through the flow limiter 20. By adjusting the size of the orifice valve 30, the differential pressure between the cavity 25 adjacent the outlet and the cavity 27 adjacent the inlet can be adjusted relative to the flow rate and therefore the flow rate at which the piston 22 moves can be tailored. As the flow rate of fluid through the flow limiter 20 reaches a constant value the piston 22 will be moved to an essentially constant position in the flow limiter 20.

To begin the starting of the APU 10 an operator first opens the manual valve 32 between the flow limiter 20 and the hydraulic starter motor 16. The manual valve 32 is spring loaded closed until an operator opens the manual valve 32 against the force of the spring. The manual valve 32 is of a type known in the art. With the manual valve 32 open hydraulic fluid is passed to the hydraulic starter motor 16 which begins to start the APU 10 through the gearbox 18. Also turned via the gearbox 18 by the hydraulic starter motor 16 is a permanent magnet generator 34. The output of the permanent magnet generator 34 is provided first to a power conditioning unit 36 and then to an electronic controller 38. When the APU is operating at its normal operating speed, the outputs of the electronic controller 38 are used to open and close fuel valves for the APU. When the APU gains rotational speed up to between 5 and 10 percent of normal speed there is sufficient electrical power supplied from the permanent magnet generator 34 to the electronic controller 38 to energize the solenoid valve 40 open. This solenoid valve 40 is in parallel with the manual valve 32, and the solenoid valve 40 is of a type known in the art. The output of the electronic controller 38 is provided so that when the solenoid valve 40 is opened a light 42 is turned on. Turning on light 42 or, in the alternative, activating some electromechanical device (not shown) notifies the operator that the manual valve 32 can be closed. With hydraulic fluid continuing to be supplied to the hydraulic starter motor 16 through the now opened solenoid valve 40 the APU 10 continues to gain rotational speed. At typically 50 to 55 percent of normal rotational speed from the APU 10 the electronic controller 38 will cease to provide electric power to the solenoid valve 40 which will then be closed. The APU 10 with the permanent magnet generator 34 providing electrical power to the electronic controller 38 will now reach its normal operating rotational speed.

After the operator opens the manual valve 32 to begin the starting process of APU 10, it is important to keep the manual valve 32 open and supplying hydraulic fluid to the hydraulic starter motor 16. When the APU 10 is started, however, manual valve 32 must be closed. If the manual valve 32 is closed too late the hydraulic starter motor 16 could be damaged by overspeeding. To help prevent this occurring an upper value on the flow rate of hydraulic fluid to the hydraulic starter motor 16 is set by the flow limiter 20. Further, by having the hydraulic starter motor 16 be a positive displacement motor in combination with a flow limiter 20, there should not be any potentially damaging overspeeding of the hydraulic starter motor 16. This arrangement results in an easier to operate, safer starting system.

Figure 3:
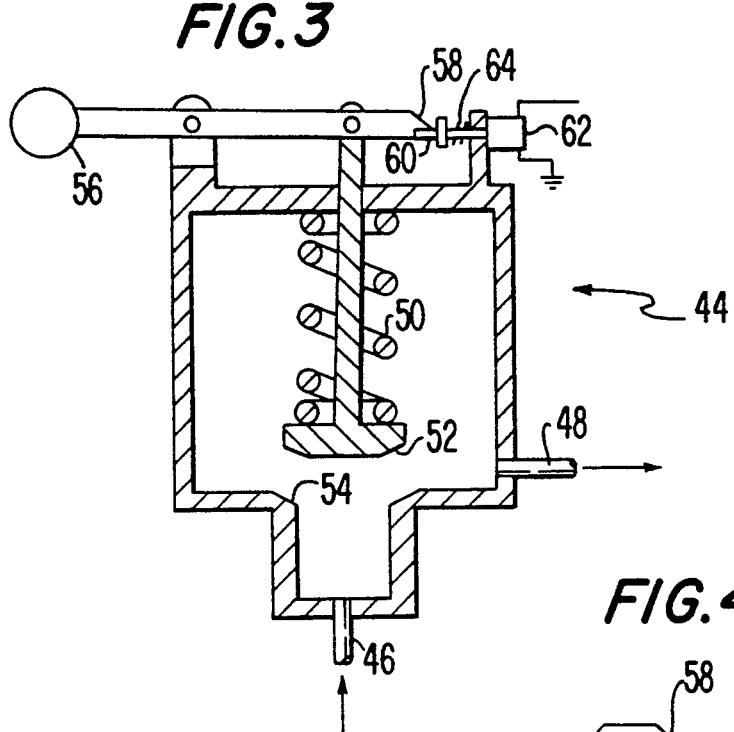
FIG. 3 is a sectional view of a combined manual and solenoid valve for providing hydraulic fluid to a hydraulic starter motor in accordance with the present invention.

Another preferred embodiment of the present invention is to combine the functions of manual valve 32 and solenoid valve 40 into a combined control valve 44 as shown in FIG. 3. To use the combined control valve 44, the hydraulic fluid from the outlet 29 of the flow limiter 20 is provided to the inlet 46 of the combined control valve 44, and the outlet 48 of the combined control valve 44 provides hydraulic fluid to the hydraulic starter motor 16. Here, before the starting process is begun, the combined control valve 44 is maintained in a closed configuration by the spring 50 forcing the valve plug 52 against the valve seat 54. To begin the starting process, the operator pushes down on the combined control valve 44 handle 56 which raises the valve plug 52 from the valve seat 54 and allows hydraulic fluid to flow to the hydraulic starter motor 16. The operator pushes the handle 56 down sufficiently that the handle notch 58 is latched up by a solenoid plunger 60. The solenoid plunger 60 is controlled by solenoid 62 and spring 64. When no electrical energy is provided to the solenoid 62 the spring 64 pushes the solenoid plunger 60 into position so as to maintain the handle 56 up and the combined control valve 44 open. Unlike before, when the APU gains rotational speed up to between 5 and 10 percent of normal speed, there is no electrical power supplied from the electronic controller 38 as an output signal to solenoid 62. Instead, the electronic controller 38 does not put out a signal to energize solenoid 62 until the APU 10 has reached a rotational speed of 50 to 55 percent of normal rotational speed. Then the electronic controller 38 provides a signal to energize solenoid 62. Having the solenoid 62 energized causes the plunger 60 to be retracted which allows the spring 50 to force the valve plug 52 to firmly contact the valve seat 54 so as to close off flow of hydraulic fluid from the combined control valve 44.

Figure 4:
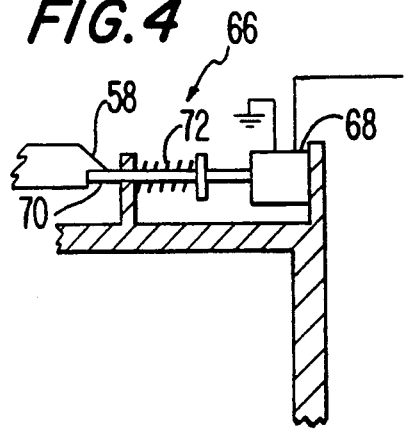
FIG. 4 is a partial sectional view of an alternative solenoid to that shown in FIG. 3.

An alternative solenoid system 66 for the combined control valve 44 is shown in FIG. 4. Here, instead of having the operator push the handle 56 down until the handle notch 58 is latched up by the solenoid plunger 60; the operator pushes the handle 56 down and holds it in that position until the APU 10 gains a rotational speed of between 5 and 10 percent of normal speed. At that time sufficient electrical power is provided by the permanent magnet generator 34 to energize the electronic controller 38 to output a signal energizing the solenoid 68 shown in FIG. 4. When energized, the solenoid 68 forces the plunger 70 against the spring 72 and allows the operator to release the handle 56 so that: the handle notch 58 can be latched up by the plunger 70. The solenoid 68 is continually energized by the electronic controller 38 until the APU 10 reaches a rotational speed of 50 to 55 percent of normal speed. At that time the electronic controller 38 ceases to output a signal to the solenoid 68 which causes the spring 72 to force the plunger 70 away from the handle latch 58. Thus, the spring 50 forces the valve plug 52 against the valve seat 54 and closes off flow of hydraulic fluid from the combined control valve 44.

Figure 5:
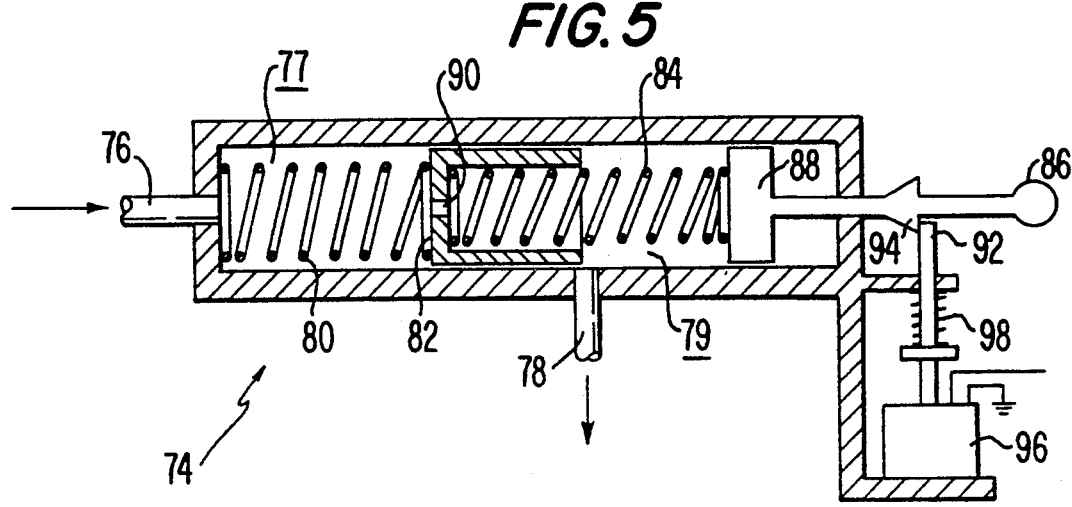
FIG. 5 is a sectional view of an alternative combined manual and solenoid valve with a flow limiter for providing hydraulic fluid to a hydraulic starter motor in accordance with the present invention.

Still in another preferred embodiment of the present invention the functions of the manual valve 32, solenoid valve 40 and flow limiter 20 are combined into a combined limiter control valve 74 as shown in FIG. 5. Here, hydraulic fluid from the hydraulic accumulator 12 is provided directly to the inlet 76 of the combined limiter control valve 74 and hydraulic fluid can be provided from the outlet 78 to the hydraulic starter motor 16. With the handle 86 not pushed into the combined limiter control valve 74 the spring 80 will force the piston 82 to close the outlet 78 of the combined limiter control valve 74. This closing of outlet 78 is assisted by the spring 84 being sized so as to permit the piston 82 to be forced by spring 80 to close the combined limiter control valve 74. For the operator to begin the starting process, the handle 86 is pushed into the combined limiter control valve 74 which moves plunger 88 against the spring 84 causing the piston 82 to move into the combined limiter control valve 74 and open outlet 78. With outlet 78 open, hydraulic fluid flows through the orifice 90 in the face of piston 82 and results in differential fluid pressure between the cavities 77 and 79 adjacent the inlet 76 and outlet 78. The combination of the springs 80 and 84 acting on piston 82, and the differential fluid pressures in the cavities 77 and 79 provide a flow limiter capability for the combined limiter control valve 74. For as the flow rate of hydraulic fluid through the outlet 78 just begins to exceed that which the orifice 90 in the piston 82 can pass the fluid pressure in the cavity 79 is lowered below the fluid pressure in the cavity 79. Combining this differential fluid pressure with the differential forces of springs 80 and 84 causes the piston 90 to move toward the outlet 78. If the flow rate of hydraulic fluid causes a sufficiently larger differential pressure, the piston 90 will partially close off outlet 78, thus providing the ultimate flow limiter capability and protecting the hydraulic starter motor 16 from overspeeding.

As with the combined control valve 44, when the operator pushes the handle 86 into the combined limiter control valve 74, a solenoid plunger 92 can be used to latch a handle notch 94. The arrangement shown in FIG. 5 is similar to that shown in FIG. 4. Namely, the operator pushes the handle 86 into the combined limiter control valve 74 to begin the starting process and when the APU 10 rotational speed reaches 5 to 10 percent of normal operating speed, the permanent magnet generator 34 provides sufficient electrical power to permit the electronic controller 38 to energize the solenoid 90 thus pushing on the plunger 92 against the force of spring 98 to allow the handle latch 94 to be engaged. Then, as the APU 10 rotational speed reaches 50 to 55 percent of the normal operating speed, the signal to the solenoid 96 from the electronic controller 38 is terminated and the plunger 92 is forced away from the handle latch 94 by the spring 98 so that the piston 82 closes the outlet 78. The solenoid 96 can be converted into a pulling type instead of a pushing type as shown in FIG. 5 and the spring 98 can be arranged to pull plunger 92 out of solenoid 62 instead of pushing it into the solenoid 96, then an arrangement as shown in FIG. 3 would be provided for the combined limiter control valve 74.

In still another embodiment of the present invention the flow limiter 20 is replaced by a maximum flow, rate valve 100, as shown in FIG. 6. The maximum flow rate valve 100 is connected into the starting system shown in FIG. 1 by providing hydraulic fluid from the hydraulic fluid accumulator 12 to the inlet 102 and connecting the outlet 104 to the manual valve 32 shown in FIG. 1. To begin the starting process, the operator opens the manual valve 32 and hydraulic fluid passes from the accumulator 12 through the maximum flow rate valve 100 and the manual valve 32 to the hydraulic starter motor 16. Before hydraulic fluid passes through the maximum flow rate valve 100 the piston 106 is positioned in the maximum flow rate valve 100 by the spring 108 and the equal fluid pressures in the chambers 110 and 112 on either side of the piston 106. But with the beginning of fluid flow through the maximum flow rate valve 100, the pressure in the chamber 110 is decreased with respect to the fluid pressure in the chamber 112. The magnitude of the fluid pressure difference is substantially determined by the size of the orifice 114 through which hydraulic fluid must pass from the accumulator 12 and control port 116 to enter chamber 110. In distinction, the fluid pressure in chamber 112 is directly provided from the accumulator 12 by the bypass 118. Piston 106 is not permitted to exclusively respond to differential hydraulic pressure because of the spring 108. Thus, as hydraulic fluid is supplied to the hydraulic starter motor 16 and the fluid pressure in chamber 110 decreases, the spring 108 prevents the piston 106 from moving to close the control port 116 in response to the decreased fluid pressure in chamber 110 relative to the fluid pressure in chamber 112 alone. However, if the flow rate of hydraulic fluid through the chamber 110 reaches a value that the differential pressure between the chambers 110 and 112 overcomes the force of the spring 108, then the piston 106 will close the control port 116 and no more hydraulic fluid will be supplied to the hydraulic starter motor 16. Flow can only recommence through the valve 100 if flow is stopped by either shutting off the hydraulic supply to connection 102 or from connection 104 to reset the valve 100. This upper value for the flow rate of hydraulic fluid is determined by the spring constant of the spring 108 which is non-variable and the size of the orifice 114 that can be adjusted. The adjustment of the orifice 114 size is made so the flow rate to the hydraulic starter motor 16 does not permit the hydraulic starter motor 16 to overspeed. Finally, to assist the operator, when the APU 10 reaches a rotational speed of 50 to 55 percent of normal speed the electronic controller 38 energizes the light 42 or an electromechanical indicator to notify the operator that the manual valve 32 can be closed because the APU 10 is sufficiently started.

A completely non-electrical starting system utilizing the present invention is disclosed next. For this starting system, the manual valve 32, the flow limiter 20 and the solenoid valve 40 are replaced by a mechanical controller valve 120, as shown in FIG. 7. The mechanical controller valve 120 is connected into the starting system shown in FIG. 1 by providing hydraulic fluid from the accumulator 12 to the inlet 122 and supplying hydraulic fluid from the outlet 124. Prior to beginning the starting process, the outlet 124 is closed by the piston 126. This positioning of the piston 126 is caused by the springs 128 and 130 with the plunger 132 in the fully retracted position. When the operator wants to begin the starting process, the handle 134 is pushed into the mechanical controller valve 120 and the spring 130 pushes the piston 126 against the spring 128 to open the outlet 124 so hydraulic fluid flows to the hydraulic starter motor 16. As hydraulic fluid begins to flow through the outlet 124, the fluid pressure in the chamber 136 adjacent the outlet 124 drops with respect to the fluid pressure in the chamber 138 adjacent the inlet 122. This differential fluid pressure in combination with the net force on the piston 126 caused by the springs 128 and 130 can move the piston 126 toward closing off the outlet 124. The differential fluid pressure between the chambers 136 and 138 is determined by the starter motor fluid flow and the Orifice 140 in the piston 126. Depending on the size of the orifice 140, the maximum flow rate of hydraulic fluid passing through the mechanical controller valve 120 is determined.

When the operator begins the starting process by pushing the handle 134 into the mechanical controller valve 120, the handle 134 needs to be pushed sufficiently into the mechanical controller valve 120 to have the hydraulic plunger 142 engage and latch the handle 134 via the handle latch 144. The hydraulic plunger is normally positioned to so engage the handle latch 144 because of the force of a spring 146 acting against the plunger piston 148. Also acting on the plunger piston 148 to position it in the controller housing 150 is a differential fluid pressure between the chambers 152 and 154. The fluid pressure in the chamber 152 is directly related to the fluid pressure in the chamber 136 of the mechanical controller valve 120 as provided by the bypass 156, and the fluid pressure in the chamber 154 is directly related to the fluid pressure in the chamber 2138 of the mechanical controller valve 120 as provided by the bypass 158. After the mechanical controller valve 120 handle latch 144 is engaged by the plunger 142 and hydraulic fluid flows to the hydraulic starter motor 16 the APU 10 begins to build up rotational speed. When the APU 10 rotational speed reaches 50 to 55 percent of the normal operating speed, the hydraulic fluid flow rate through the chamber 136 in the mechanical controller valve 120 causes the fluid pressure in the chamber 152 via the bypass 156 to be sufficiently low with respect to the fluid pressure in the chamber 154, which is representative of the fluid pressure in the chamber 138, that the fluid pressure in the chamber 154 pushes the plunger piston 148 into the chamber 152 against the combined forces of the spring 146 and the fluid pressure in the chamber 152. With the plunger retracted into the controller housing 150 the handle latch 144 is released and the piston 126 is forced by the springs 128 and 130, and the differential fluid pressure between the chambers 136 and 138, to close the outlet 124. Thus, a totally hydraulic and mechanical starter system is provided by the present invention for the APU 10.

The above discussion and related illustrations of the present invention are directed primarily to preferred embodiments and practices of the invention. However, it is believed that numerous changes and modifications in the actual implementation of the concepts described herein will be apparent to those skilled in the art. It is contemplated that such changes and modifications may be made without departing from the scope of the invention as defined by the following claims which cover both hydraulic and pneumatic variations of the invention.

I claim:

1. A turbine starter comprising:
    a fluid driven starter motor mechanically coupled to a turbine for starting the turbine;
    a fluid source coupled to the starter motor by a fluid circuit for providing pressurized fluid to the motor to cause the motor to start the turbine;
    an electrical generator mechanically coupled to the starter motor for generating electrical current in response to activation of the starter motor in response to flow of pressurized fluid from the source through the fluid circuit to the starter motor; and
    a valve means disposed within the fluid circuit having a first fluid path coupling the fluid source to the starter motor, being controlled in response to electrical current generated by the generator while the starter motor is activated during starting to control at least one of opening and closing of fluid flow through the first fluid path, and having a movable valve element disposed within the fluid path which is movable between an open position permitting fluid flow through the first fluid path and a closed position blocking fluid flow through the first fluid path and at least one of the positions of the movable valve element of the valve means being controlled in response to electrical current generated by the generator while the starter motor is activated during starting to control at least one of opening and closing of fluid flow through the first fluid path and a second fluid path which is parallel to the first fluid path containing a manually controlled valve coupling the fluid source to the starter motor with the manually controlled valve being used to initiate fluid flow from the source to the starter motor.

* * * * *